(12) United States Patent
Peterson et al.

(10) Patent No.: US 9,297,411 B2
(45) Date of Patent: Mar. 29, 2016

(54) BEARING ASSEMBLIES, APPARATUSES, AND MOTOR ASSEMBLIES USING THE SAME

(75) Inventors: S Barrett Peterson, Orem, UT (US); Jair J. Gonzalez, Provo, UT (US); Kenneth E. Bertagnolli, Riverton, UT (US); Debkumar Mukhopadhyay, Sandy, UT (US); David P. Miess, Highland, UT (US); Mark P. Chapman, Provo, UT (US); Ronald W. Ward, Pleasant Grove, UT (US); Nicholas Christensen, Spanish Fork, UT (US); Damon B. Crockett, Mapleton, UT (US); Mohammad N. Sani, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 588 days.

(21) Appl. No.: 13/432,224

(22) Filed: Mar. 28, 2012

(65) Prior Publication Data

US 2013/0156357 A1    Jun. 20, 2013

Related U.S. Application Data

(63) Continuation-in-part of application No. 13/234,252, filed on Sep. 16, 2011, which is a continuation-in-part of application No. 13/116,566, filed on May 26, 2011.

(51) Int. Cl.
*F16C 17/04* (2006.01)
*B21K 1/04* (2006.01)
(Continued)

(52) U.S. Cl.
CPC . *F16C 17/04* (2013.01); *B21K 1/04* (2013.01); *E21B 4/003* (2013.01); *E21B 17/03* (2013.01);
(Continued)

(58) Field of Classification Search
CPC ........ E21B 4/003; F16C 17/04; F16C 33/043; F16C 33/12; F16C 33/1085; F16C 37/002; F16C 2206/04; F16C 2206/82; F16C 2352/00
USPC ......... 384/128, 303–305, 308, 311–312, 368, 384/420, 428, 91–95, 282–285, 907.1; 29/898.041, 898.042; 175/104, 107, 175/320, 337
See application file for complete search history.

(56) References Cited

U.S. PATENT DOCUMENTS

| | | |
|---|---|---|
| 4,268,276 A | 5/1981 | Bovenkerk |
| 4,322,390 A | 3/1982 | Tolley et al. |

(Continued)

FOREIGN PATENT DOCUMENTS

| | | | |
|---|---|---|---|
| EP | 0543461 | | 5/1993 |
| GB | 1068617 A | * | 5/1967 |

(Continued)

OTHER PUBLICATIONS

Howes, "The Graphitzation of Diamond", 1962, Proc. Phys. Soc., vol. 80, pp. 648-662.

(Continued)

*Primary Examiner* — Marcus Charles
(74) *Attorney, Agent, or Firm* — Dorsey & Whitney LLP

(57) ABSTRACT

Bearing assemblies, apparatuses, and motor assemblies using the same are disclosed. In an embodiment, a bearing assembly may include a plurality of superhard bearing elements distributed circumferentially about an axis. Each of the superhard bearing elements may include a bearing surface. At least one of the plurality of superhard bearing elements may include at least one texture feature that may be formed in a lateral surface thereof. The bearing assembly may also include a support ring that carries the superhard bearing elements.

16 Claims, 11 Drawing Sheets

(51) Int. Cl.

| | | |
|---|---|---|
| *F16C 17/02* | (2006.01) | |
| *F16C 33/02* | (2006.01) | |
| *E21B 4/00* | (2006.01) | |
| *F16C 37/00* | (2006.01) | |
| *F16C 33/04* | (2006.01) | |
| *F16C 33/10* | (2006.01) | |
| *F16C 33/26* | (2006.01) | |
| *E21B 17/03* | (2006.01) | |

(52) U.S. Cl.
CPC .............. *F16C 17/02* (2013.01); *F16C 33/043* (2013.01); *F16C 33/108* (2013.01); *F16C 33/1085* (2013.01); *F16C 33/26* (2013.01); *F16C 37/002* (2013.01); *F16C 2206/04* (2013.01); *F16C 2206/82* (2013.01); *F16C 2240/42* (2013.01); *F16C 2240/48* (2013.01); *F16C 2352/00* (2013.01); *Y10T 29/49645* (2015.01)

(56) References Cited

U.S. PATENT DOCUMENTS

| | | | |
|---|---|---|---|
| T102,901 I4 * | 4/1983 | Offenbacher | 29/898.041 |
| 4,410,054 A | 10/1983 | Nagel et al. | |
| 4,468,138 A * | 8/1984 | Nagel | 384/303 |
| 4,560,014 A | 12/1985 | Geczy | |
| 4,592,433 A | 6/1986 | Dennis | |
| 4,629,373 A * | 12/1986 | Hall | 407/118 |
| 4,662,348 A * | 5/1987 | Hall et al. | 384/907.1 |
| 4,738,322 A | 4/1988 | Hall et al. | |
| 4,789,251 A * | 12/1988 | McPherson et al. | 384/317 |
| 4,811,801 A | 3/1989 | Salesky et al. | |
| 4,852,671 A | 8/1989 | Southland | |
| 4,913,247 A | 4/1990 | Jones | |
| 4,951,762 A | 8/1990 | Lundell | |
| 4,984,642 A | 1/1991 | Renard et al. | |
| 4,993,505 A | 2/1991 | Packer et al. | |
| 5,016,718 A | 5/1991 | Tandberg | |
| 5,054,246 A | 10/1991 | Phaal et al. | |
| 5,092,687 A * | 3/1992 | Hall | 384/303 |
| 5,120,327 A | 6/1992 | Dennis | |
| 5,135,061 A | 8/1992 | Newton, Jr. | |
| 5,154,245 A | 10/1992 | Waldenstrom et al. | |
| 5,172,778 A | 12/1992 | Tibbetts | |
| 5,180,022 A | 1/1993 | Brady | |
| 5,267,398 A * | 12/1993 | Hall | 29/898.041 |
| 5,342,129 A | 8/1994 | Dennis et al. | |
| 5,351,772 A | 10/1994 | Smith | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,512,235 A | 4/1996 | Cerutti et al. | |
| 5,544,713 A | 8/1996 | Dennis | |
| 5,558,170 A | 9/1996 | Thigpen et al. | |
| 5,560,716 A * | 10/1996 | Tank et al. | 384/492 |
| 5,590,729 A | 1/1997 | Cooley et al. | |
| 5,667,028 A * | 9/1997 | Truax et al. | 175/428 |
| 5,788,001 A | 8/1998 | Matthias et al. | |
| 5,979,578 A * | 11/1999 | Packer | 175/432 |
| 6,135,219 A | 10/2000 | Scott | |
| 6,145,608 A | 11/2000 | Lund et al. | |
| 6,187,068 B1 | 2/2001 | Frushour et al. | |
| 6,190,096 B1 | 2/2001 | Arthur | |
| 6,258,139 B1 | 7/2001 | Jensen | |
| 6,272,753 B2 | 8/2001 | Packer | |
| 6,315,067 B1 | 11/2001 | Fielder | |
| 6,419,034 B1 | 7/2002 | Belnap et al. | |
| 6,447,560 B2 | 9/2002 | Jensen | |
| 6,460,637 B1 | 10/2002 | Siracki et al. | |
| 6,793,681 B1 | 9/2004 | Pope et al. | |
| 7,108,598 B1 * | 9/2006 | Galloway | 451/542 |
| 7,152,701 B2 | 12/2006 | Butland et al. | |
| 7,316,279 B2 | 1/2008 | Wiseman et al. | |
| 7,552,782 B1 * | 6/2009 | Sexton et al. | 384/97 |
| 7,553,740 B2 | 6/2009 | Sharp et al. | |
| 7,559,695 B2 * | 7/2009 | Sexton et al. | 384/95 |
| 7,585,342 B2 | 9/2009 | Cho | |
| 7,608,333 B2 * | 10/2009 | Eyre | 428/408 |
| 7,670,406 B2 | 3/2010 | Belashchenko | |
| 7,703,982 B2 * | 4/2010 | Cooley | 384/215 |
| 7,866,418 B2 | 1/2011 | Bertagnolli et al. | |
| 7,870,913 B1 * | 1/2011 | Sexton et al. | 384/215 |
| 7,896,551 B2 * | 3/2011 | Cooley et al. | 384/282 |
| 7,901,137 B1 * | 3/2011 | Peterson | 384/284 |
| 7,946,768 B2 * | 5/2011 | Cooley et al. | 384/215 |
| 7,998,573 B2 | 8/2011 | Qian et al. | |
| 8,020,471 B2 | 9/2011 | Hall et al. | |
| 8,034,136 B2 | 10/2011 | Sani | |
| 8,147,142 B1 * | 4/2012 | Peterson | 384/92 |
| 8,157,029 B2 | 4/2012 | Zhang et al. | |
| 8,383,984 B2 | 2/2013 | Osako et al. | |
| 8,393,419 B1 | 3/2013 | Burton | |
| 8,534,391 B2 | 9/2013 | Wirth | |
| 8,561,727 B1 | 10/2013 | Pope et al. | |
| 8,739,904 B2 | 6/2014 | Patel | |
| 8,807,247 B2 | 8/2014 | Scott et al. | |
| 8,950,519 B2 | 2/2015 | Gonzalez et al. | |
| 2001/0037609 A1 | 11/2001 | Jensen | |
| 2004/0007394 A1 | 1/2004 | Griffin | |
| 2004/0190804 A1 * | 9/2004 | John et al. | 384/420 |
| 2005/0133277 A1 | 6/2005 | Dixon | |
| 2006/0102389 A1 | 5/2006 | Wiseman | |
| 2007/0034147 A1 | 2/2007 | Wort et al. | |
| 2007/0046119 A1 * | 3/2007 | Cooley | 310/90.5 |
| 2007/0181348 A1 | 8/2007 | Lancaster et al. | |
| 2007/0187155 A1 * | 8/2007 | Middlemiss | 175/428 |
| 2009/0114628 A1 | 5/2009 | DiGiovanni | |
| 2009/0242525 A1 | 10/2009 | O'Brien et al. | |
| 2009/0260877 A1 | 10/2009 | Wirth | |
| 2010/0218995 A1 * | 9/2010 | Sexton et al. | 175/57 |
| 2010/0226759 A1 * | 9/2010 | Cooley et al. | 384/95 |
| 2010/0270088 A1 | 10/2010 | Zhang et al. | |
| 2010/0314176 A1 | 12/2010 | Zhang et al. | |
| 2011/0017520 A1 | 1/2011 | Webb | |
| 2011/0031036 A1 | 2/2011 | Patel | |
| 2011/0073379 A1 | 3/2011 | DiGiovanni et al. | |
| 2011/0174544 A1 * | 7/2011 | Scott et al. | 384/420 |
| 2012/0048626 A1 | 3/2012 | Bellin | |
| 2012/0175652 A1 | 7/2012 | Chyr et al. | |
| 2012/0281938 A1 * | 11/2012 | Peterson et al. | 384/306 |
| 2012/0325563 A1 | 12/2012 | Scott et al. | |
| 2015/0239097 A1 | 8/2015 | Chapman et al. | |

FOREIGN PATENT DOCUMENTS

| | | |
|---|---|---|
| GB | 2510341 | 8/2014 |
| JP | H06-170571 | 6/1994 |

OTHER PUBLICATIONS

Pilkey, "Formulas for Stress, Strain, and Structural Matrices", 2005, John Wiley & Sons, 2nd Edition, pp. 255-305.
U.S. Appl. No. 13/166,007, Oct. 23, 2013, Office Action.
U.S. Appl. No. 13/116,566, Oct. 2, 2013, Office Action.
U.S. Appl. No. 13/234,252, Oct. 4, 2013, Office Action.
U.S. Appl. No. 13/234,252, filed Sep. 16, 2011, Gonzalez et al.
U.S. Appl. No. 13/116,566, filed May 26, 2011, Miess.
U.S. Appl. No. 11/545,929, filed Oct. 10, 2006, Bertagnolli et al.
U.S. Appl. No. 13/166,007, filed Jun. 22, 2011, Chapman et al.
U.S. Appl. No. 13/116,566, Mar. 26, 2014, Office Action.
U.S. Appl. No. 13/234,252, Jan. 28, 2014, Office Action.
U.S. Appl. No. 13/166,007, May 21, 2014, Office Action.
U.S. Appl. No. 13/234,252, May 5, 2014, Notice of Allowance.
U.S. Appl. No. 12/558,939, filed Sep. 14, 2009, Miess et al.
U.S. Appl. No. 12/691,787, filed Dec. 7, 2010, Mukhopadhyay, et al.
Joseph, B., et al.—Liquid metal embrittlement: A state-of-the-art appraisal—The European Physical Journal Applied Physics, 1999.
Tze-Pin Lin, Michael Hood, George A. Cooper, and Redd H. Smith, Residual Stresses in Polycrystalline Diamond Compacts, J. Am. Ceram. Soc. 77[6] pp. 1562-1568 (1994).

(56) References Cited

OTHER PUBLICATIONS

Davis, J.R. Editor, "Corrosion Behavior of Nickel and Nickel Alloys", Nickel, Cobalt, and Their Alloys, ASM Specialty Handbook, Jan. 1, 2000, pp. 157.
Davis, J.R., Editor, "Failures from Various Mechanisms and Related Environmental Factors", Metals Handbook Desk Edition, Second Edition (ASM International), published Decemeber 1998, pp. 1231-1232.
Smith International, Geodiamond, "Quick Cutter", available as of Nov. 9, 2010, (3 pages).
U.S. Appl. No. 13/116,566, Aug. 1, 2013, Office Action.
U.S. Appl. No. 14/452,206, filed Aug. 5, 2009, Gonzalez, et al.
International Search Report from International Application No. PCT/US2013/033324 mailed Aug. 30, 2013.
U.S. Appl. No. 13/234,252, Aug. 20, 2014, Issue Notification.
U.S. Appl. No. 13/116,566, Jun. 9, 2014, Notice of Allowance.
U.S. Appl. No. 14/481,592, filed Sep. 9, 2014, Miess.
U.S. Appl. No. 13/166,007, Sep. 10, 2014, Office Action.
U.S. Appl. No. 13/116,566, Oct. 1, 2014, Issue Notification.
U.S. Appl. No. 13/234,252, Sep. 23, 2014, Notice of Allowance.
U.S. Appl. No. 13/166,007, May 11, 2015, Notice of Allowance.
U.S. Appl. No. 13/166,007, Jun. 3, 2015, Issue Notification.
U.S. Appl. No. 13/166,007, Feb. 3, 2015, Notice of Allowance.
U.S. Appl. No. 13/234,252, Jan. 21, 2015, Issue Notification.
U.S. Appl. No. 14/452,206, Jun. 30, 2015, Office Action.
U.S. Appl. No. 14/452,206, Oct. 23, 2015, Office Action.

* cited by examiner

BEARING ASSEMBLIES, APPARATUSES, AND MOTOR ASSEMBLIES USING THE SAME

CROSS REFERENCE TO RELATED APPLICATIONS

This application is a continuation-in-part of U.S. patent application Ser. No. 13/234,252 filed on 16 Sep. 2011, which is a continuation-in-part of U.S. patent application Ser. No. 13/116,566 filed 26 May 2011. Each of the foregoing applications is incorporated herein, in its entirety, by this reference.

BACKGROUND

Subterranean drilling systems that employ downhole drilling motors are commonly used for drilling boreholes in the earth for oil and gas exploration and production. Such a subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole can be connected to the output shaft. As the borehole is drilled with the rotary drill bit, pipe sections may be connected to the subterranean drilling system to form a drill string capable of progressively drilling the borehole to a greater size or depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to help cool and lubricate the bearing elements of the thrust-bearing apparatuses. Insufficient heat removal may cause premature damage to the thrust-bearing apparatuses.

The on-bottom and off-bottom thrust carried by the thrust-bearing apparatuses can also be extremely large and generate significant amounts of energy. The operational lifetime of the thrust-bearing apparatuses often can determine the useful life of the subterranean drilling system. Therefore, manufacturers and users of bearing apparatuses and subterranean drilling systems continue to seek improved bearing assemblies and apparatuses with a longer useful life.

SUMMARY

Various embodiments of the invention relate to bearing assemblies, bearing apparatuses and motor assemblies that include superhard bearing elements having texture features configured to improve lubrication, cooling, and/or bearing capacity of the superhard bearing elements. At least some of the superhard bearing elements may be provided with at least one texture feature formed in a lateral surface thereof to promote lubrication and/or cooling and enhance bearing capacity during use.

In an embodiment, a bearing assembly may include a plurality of superhard bearing elements distributed circumferentially about an axis. Each of the superhard bearing elements may include a bearing surface. At least one of the plurality of superhard bearing elements may include at least one texture feature formed in a lateral surface thereof. The bearing assembly may also include a support ring that carries the superhard bearing elements. In an embodiment, the at least one texture feature may be positioned and configured to direct lubricating fluid over and/or around the superhard bearing elements. In an embodiment, the at least one texture feature may be effective to increase a surface area of the superhard bearing elements in contact with lubricating fluid. In an embodiment, the at least one texture feature may follow a path extending along a generally helical curve.

In an embodiment, a bearing apparatus may include two bearing assemblies. At least one of the two bearing assemblies may be configured as any of the disclosed bearing assembly embodiments that are configured to improve lubrication and/or cooling of the superhard bearing elements during use.

In an embodiment, a method for manufacturing a bearing assembly may include forming at least one texture feature in a lateral surface of a superhard bearing element. The method may further include securing the superhard bearing element to a support ring. In an embodiment, the at least one texture feature may be formed before securing the superhard bearing element to the support ring. In an embodiment, the at least one texture feature may be formed after securing the superhard bearing element to the support ring. In an embodiment, forming the at least one texture feature may include laser-cutting the texture feature in the lateral surface. In an embodiment, forming the at least one texture feature may include computer numerical control milling the at least one texture feature in the lateral surface.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Figure 1A:
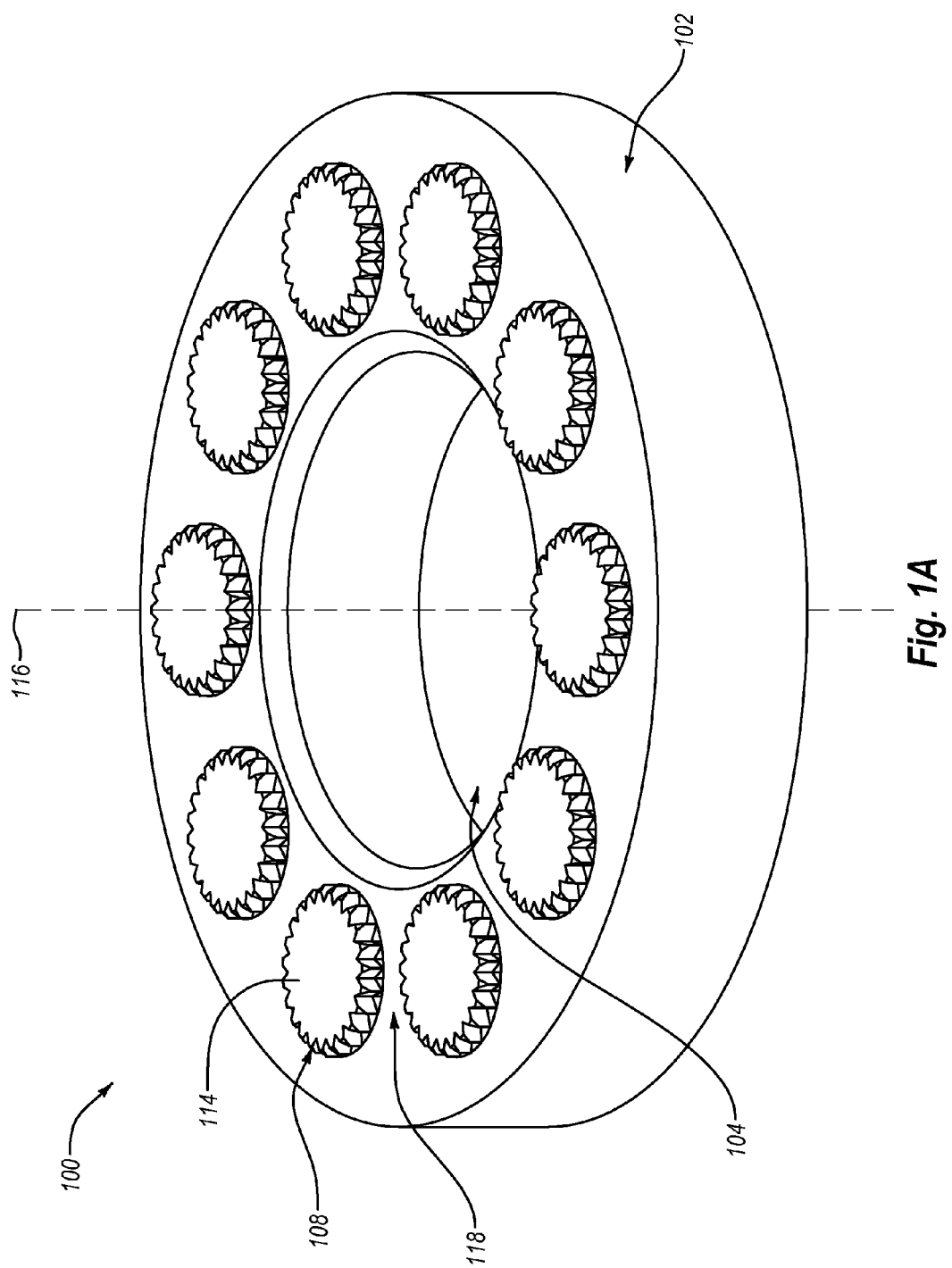
FIG. 1A is an isometric view of a thrust-bearing assembly according to an embodiment.
Figure 1B:
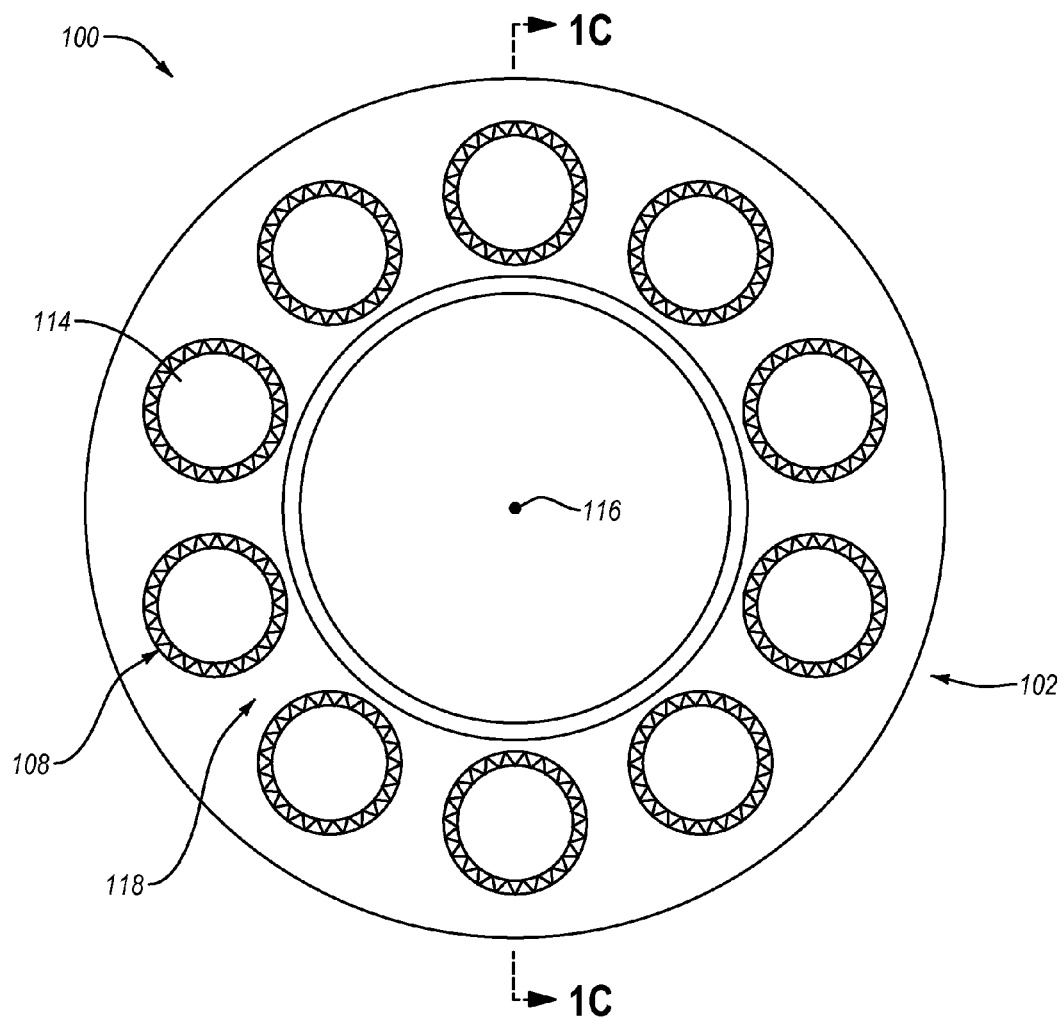
FIG. 1B is a top plan view of the thrust-bearing assembly shown in FIG. 1A.

Embodiments of the invention relate to bearing assemblies, bearing apparatuses and motors, pumps, or other mechanical assemblies that include superhard bearing elements having texture features configured to improve lubrication and/or cooling of the superhard bearing elements. During use, the superhard bearing elements may not be able to effectively cool so at least some of the superhard bearing elements may be provided with one or more texture features (e.g., at least one groove, dimple, recess, groove pattern, or other topography) formed therein to promote lubrication and/or cooling during use. FIGS. 1A and 1B are isometric and top plan views of a thrust-bearing assembly 100 according to an embodiment.

Figure 1C:
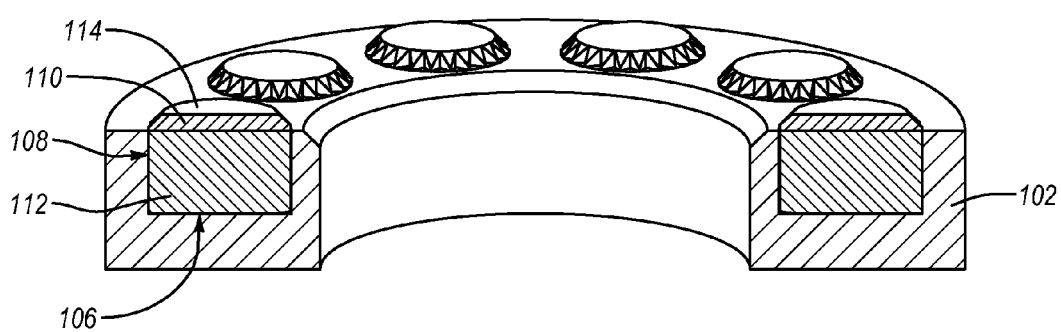
FIG. 1C is an isometric cutaway view taken along line 1C-1C of the thrust-bearing assembly shown in FIG. 1B.

The thrust-bearing assembly 100 may form a stator or a rotor of a thrust-bearing apparatus used in a subterranean drilling system. As shown in FIGS. 1A and 1B, the thrust-bearing assembly 100 may include a support ring 102 defining an opening 104 through which a shaft (not shown) of, for example, a downhole drilling motor may extend. The support ring 102 may be made from a variety of different materials. For example, the support ring 102 may comprise a metal, alloy steel, a metal alloy, carbon steel, stainless steel, tungsten carbide, or any other suitable metal or conductive or non-conductive material. The support ring 102 may include a plurality of recesses 106 (shown in FIG. 1C) formed therein.

The thrust-bearing assembly 100 further may include a plurality of superhard bearing elements 108. In an embodiment, one or more of the superhard bearing elements 108 may have a generally cylindrical shaped body. While the superhard bearing elements 108 are shown having a generally cylindrical shaped body, the one or more of the superhard bearing elements may have a generally rounded rectangular shaped body, a generally oval shaped body, a generally wedge shaped body, or any other suitable shaped body. The superhard bearing elements 108 may include a superhard table 110 bonded to a substrate 112, and a bearing surface 114 of the superhard table 110. The superhard bearing elements 108 are illustrated in FIGS. 1A and 1B being distributed circumferentially about a thrust axis 116 along which a thrust force may be generally directed during use. As shown, gaps 118 may be located between adjacent ones of the superhard bearing elements 108. In an embodiment, at least one of, some of, or all of the gaps 118 may exhibit a width of about 0.00020 inches to 0.100 inches, such as about 0.00040 inches to 0.0010 inches, or about 0.00040 inches to 0.080 inches. In other embodiments, the gaps 118 may have widths that are relatively larger or smaller. In other embodiments, the gaps 118 may substantially be zero.

Each of the superhard bearing elements 108 may be partially disposed in a corresponding one of the recesses 106 (shown in FIG. 1C which is an isometric cutaway view taken along line 1C-1C of the thrust-bearing assembly shown in FIG. 1B) of the support ring 102 and secured partially therein via brazing, press-fitting, threadly attaching, fastening with a fastener, combinations of the foregoing, or another suitable technique. The superhard bearing elements 108 may be pre-machined to tolerances and mounted in the support ring 102 and/or mounted to the support ring 102 and the bearing surfaces 114 thereof and planarized (e.g., by lapping and/or grinding) so that the bearing surfaces 114 are substantially coplanar. Optionally, one or more of the superhard bearing elements 108 may exhibit a peripherally extending edge chamfer. However, in other embodiments, the edge chamfer may be omitted.

FIGS. 1D-1G are isometric, side elevation, and top plan views of a superhard bearing element 108 removed from the thrust-bearing assembly 100. As used herein, a "superhard bearing element" is a bearing element including a bearing surface that is made from a material exhibiting a hardness that is at least as hard as tungsten carbide.

In any of the embodiments disclosed herein, the superhard bearing elements 108 may each comprise one or more superhard materials, such as polycrystalline diamond, polycrystalline cubic boron nitride, silicon carbide, tungsten carbide, or any combination of the foregoing superhard materials. For example, the superhard table 110 may comprise polycrystalline diamond and the substrate 112 may comprise cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements can be made are disclosed in U.S. Pat. Nos. 7,866,418; 7,998,573; and 8,034,136; and co-pending U.S. patent application Ser. No. 11/545,929; the disclosure of each of the foregoing patents and applications is incorporated herein, in its entirety, by this reference.

The diamond particles that may be used to fabricate the superhard table 110 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 40 μm, 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements 108 may be free-standing (e.g., substrateless) and formed from a polycrystalline diamond body that is at least partially or fully leached to remove a metal-solvent catalyst initially used to sinter the polycrystalline diamond body.

Figure 1D:
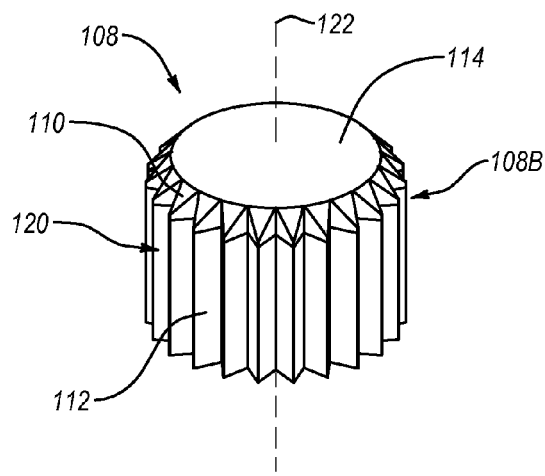
FIG. 1D is an isometric view of one of the superhard bearing elements removed from the thrust-bearing assembly shown in FIG. 1A.

Referring to FIG. 1D, at least some of the superhard bearing elements 108 may include one or more texture features (e.g., at least one groove, dimple, recess, pattern, other topography, or combinations thereof) configured to influence cooling, lubrication, and/or bearing capacity of the superhard bearing elements 108 and/or the support ring 102. For example, one or more grooves 120 may be formed in a lateral surface 108B of the superhard bearing elements 108. In an embodiment, the grooves 120 may provide one or more flow paths for lubricating fluid between the lateral surfaces 108B of the superhard bearing elements 108 and/or sidewalls of the recesses 106 in the support ring 102. Such a configuration may increase the surface area of the superhard bearing elements 108 and/or the support ring 102 in contact with the lubricating fluid to enhance cooling the thrust-bearing assembly 100. In an embodiment, the grooves 120 may direct lubricating fluid over and/or around the superhard bearing elements 108 and/or the support ring 102 to enhance cooling and/or lubrication. In an embodiment, the grooves 120 may influence flow characteristics of the lubricating fluid. In an embodiment, the grooves 120 may increase bearing capacity by helping to prevent the superhard bearing elements from overheating. For example, the grooves 120 may increase the surface area of the superhard bearing elements 108 to enhance heat transfer from the superhard bearing elements 108. In yet other embodiments, the grooves 120 may increase bearing capacity by providing engagement features for adhesives, epoxy, or other securing elements to help secure the superhard bearing elements 108 in the recesses 106.

The one or more grooves 120 may be formed by electro-discharge machining ("EDM"), laser-cutting, computer numerical control ("CNC") milling, grinding, combinations thereof, or otherwise machining the one or more grooves 120 in the superhard bearing elements 108 before or after securing the superhard bearing elements 108 to the support ring 102. For example, suitable laser-cutting techniques are disclosed in U.S. application Ser. No. 13/166,007 filed on Jun. 22, 2011, the disclosure of which is incorporated herein, in its entirety, by this reference.

Figure 1E:
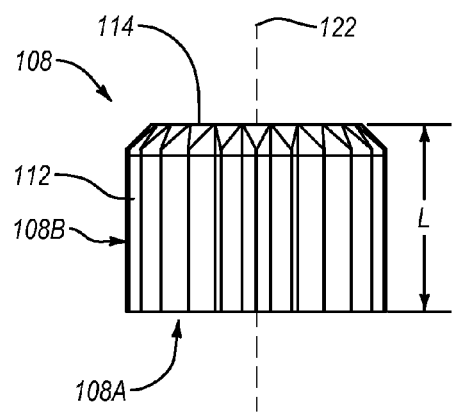
FIG. 1E is a side elevation view of the superhard bearing element shown in FIG. 1D.

As shown in FIG. 1E, some or all of the grooves 120 may follow a generally straight path along the lateral surface 108B with a length L that extends axially generally between the bearing surface 114 and a bottom surface 108A of the superhard bearing element 108. Such a configuration may develop eddies in the lubricating fluid flowing generally traverse to the grooves 120 to enhance the cooling of the lubricating fluid. In other embodiments, the length L of some or all of the grooves 120 may extend along only a portion of the lateral surface 108B. For example, as shown in FIG. 1G, the grooves 120 may extend between the bearing surface 114 and a first location above the bottom surface 108A of the superhard bearing element 108. In an embodiment, the first location may generally correspond to an upper surface of the support ring 102 such that the grooves 120 extend between the bearing surface 114 and the upper surface of the support ring 102. Such a configuration may help to secure the superhard bearing elements 108 within the recesses 106. For example, brazed-joint strength between the superhard bearing element 108 the recess 106 may be improved by providing a lateral surface on the portion of the superhard bearing element 108 within the recess 106 that generally corresponds to the lateral surface of the recess 106. Moreover, while the grooves 120 are illustrated following a generally straight path, some or all of the grooves 120 may follow a generally arcuate path, a generally semi-cylindrical path, a generally S-shaped path, a generally U-shaped path, a generally V-shaped path, a generally linear path, or any other suitable path.

In an embodiment, the length L of the grooves 120 may be about 0.3 inches to about 1 inch, such as about 0.25 inches to about 0.5 inch or about 0.10 inch to about 0.3 inch. However, in other embodiments, the length L of the grooves 120 may be longer or shorter than the foregoing ranges. As illustrated, each of the grooves 120 may have at least substantially the same length L. However, in other embodiments, some or all of the grooves 120 may have substantially different lengths L, respectively. For example, in an embodiment, the superhard bearing elements 108 may include a first group of grooves 120 having lengths L of about 0.25 inch and a second group of grooves 120 having lengths L of about 0.5 inches.

While all the superhard bearing elements 108 are shown including substantially identical grooves 120, in other embodiments, only a portion of the superhard bearing elements 108 may have substantially identical grooves 120, the superhard bearing elements 108 may have grooves 120 of varying sizes and/or configurations, or only some of the superhard bearing elements 108 may include grooves 120.

The superhard bearing element 108 may have a height extending between the bearing surface 114 and the bottom surface 108A. In an embodiment, the relationship between the length L of the grooves 120 and the height of the superhard bearing elements 108 may be configured to influence cooling, lubrication and/or bearing capacity of the superhard bearing elements 108 and/or support ring 102. The length L of at least one of the grooves 120 may be at least: about five (5) percent; about fifteen (15) percent; about twenty five (25) percent; about fifty (50) percent; about seventy (70) percent; about eighty (80) percent; or about one hundred (100) percent of the height of the superhard bearing elements 108. In other embodiments, the length L of one or more of the grooves 120 may be about two (2) percent to about one hundred (100) percent; about ten (10) percent to about ninety (90) percent; or at least about twenty (20) percent of the height of at least one of the superhard bearing elements 108. In other embodiments, the length L of one or more of the grooves 120 and the height of one or more of the superhard bearing elements 108 may be larger or smaller relative to each other.

Figure 1F:
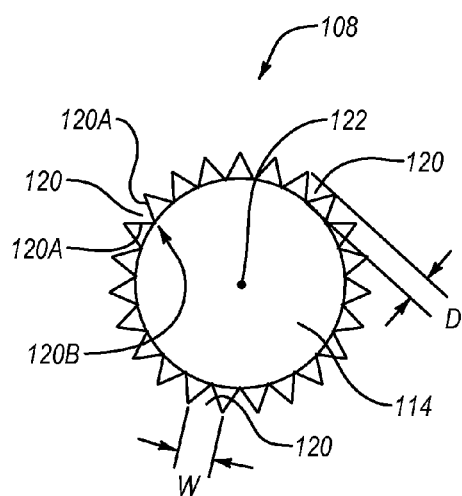
FIG. 1F is a top plan view of the superhard bearing element shown in FIG. 1D.
Figure 1G:
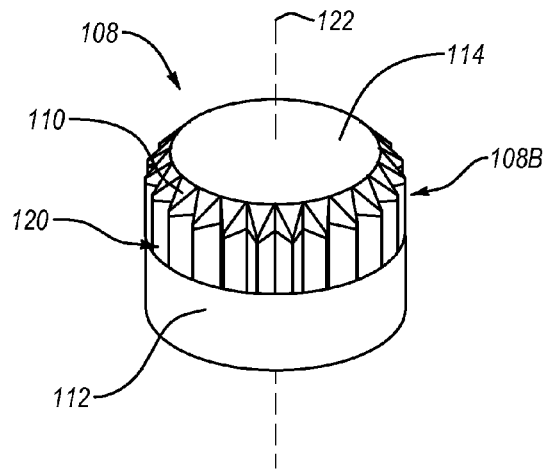
FIG. 1G is an isometric view of a superhard bearing element according to another embodiment.

As illustrated in FIG. 1F, each of the grooves 120 may be further defined by a bottom portion 120B and opposing sidewalls 120A. In an embodiment, the grooves 120 may include edge features configured to influence flow conditions. For example, the grooves 120 may include beveled edges, rounded edges, chamfered edges, or the like. One or more of the grooves 120 may include edges that are sharpened, have notches, irregularly shaped, combinations thereof, or the like. Such a configuration may allow the grooves 120 to partially agitate, break-up or create desired flow characteristics in the lubricating fluid.

The grooves 120 may be substantially equidistantly and circumferentially distributed about a lateral periphery of the superhard bearing element 108. In other embodiments, the grooves 120 may be unevenly distributed about the periphery of the superhard bearing element 108. For example, the superhard bearing element 108 may include two grooves 120 on a first side of the lateral surface 108B and no grooves on a second side of the lateral surface 108B generally opposite the first side. In an embodiment, one or more of the grooves 120 may be formed generally parallel to an axis 122 of the superhard bearing element 108. In other embodiments, one or more of the grooves 120 may be generally non-parallel to the axis 122 of the superhard bearing element 108.

In an embodiment, the grooves 120 may have a generally V-shaped cross-section such that the bottom portion 120B is at least partially defined by the intersection of the opposing sidewalls 120A. In other embodiments, the grooves 120 may have a generally rectangular cross-section, a generally U-shaped cross-section, a generally semi-circular shaped cross-section, a generally parabolic shaped cross-section, a generally trapezoidal shaped cross-section, combinations thereof, or the like. The cross-section of the grooves 120 may influence the flow conditions of the lubricating fluid and/or the cooling of the superhard bearing elements 108. For example, in an embodiment, at least one of the grooves 120 may have a portion including a V-shaped cross-section configured to improve cooling of the superhard bearing element 108 and/or lubrication of the bearing surface 114 by increasing the fluid velocity of the lubricating fluid through that portion of the groove 120 and/or increasing the surface area in contact with the lubricating fluid. In other embodiments, the grooves 120 may include a first deeper cross-sectional shape followed by a second shallower cross-sectional shape to pump or impel the lubricating fluid.

Referring still to FIG. 1F, at least one of the grooves 120 may have a width W and a depth D. Variations of the depth D and/or the width W of the grooves 120 may help the grooves 120 lubricate and/or cool the superhard bearing elements 108. As shown in FIG. 1F, the depth D of the grooves 120 extends between the bottom portion of the grooves 120 and the lateral surface 108B. For example, the depth D may be about 0.1 inches to about 0.4 inches, such as about 0.15 inches to about 0.25 inches. As illustrated, the grooves 120 may have at least substantially the same depth D. However, in other embodiments, the grooves 120 may have at least substantially different depths D. In addition, the depths D of a groove 120 may vary along its path. For example, at least one of the grooves 120 may have a depth D that includes a deeper portion and a shallower portion.

As shown in FIG. 1F, the width W of the grooves 120 extends between the grooves 120. In an embodiment, the widths W of the grooves 120 may vary. For example, some or all of the grooves 120 may have a width W that tapers from the lateral surface 108B of the superhard bearing element 108 toward the bottom portion of the grooves 120. Such a configuration may provide the grooves 120 with a wider inlet for the lubricating fluid. In an embodiment, the width W of the grooves 120 may be about 0.1 inches to about 0.5 inches, such as about 0.2 inches to about 0.3 inches. In other embodiments, the widths W of the grooves 120 may be wider or narrower. As illustrated, the grooves 120 may have at least substantially the same width W. However, in other embodiments, some or all of the grooves 120 may have substantially different widths W.

In an embodiment, the relationship between the length L of one or more of the grooves 120 and the depth D of one or more of the grooves 120 may be configured to improve cooling, lubrication, and/or bearing capacity of the superhard bearing elements 108 and/or the support ring 102. For example, the length L of at least one of the grooves 120 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the depth D of at least one of the grooves 120. In addition, the length L of at least one of the grooves 120 may be: about four hundred (400) percent to eight hundred (800) percent; or about five hundred (500) percent to seven hundred (700) percent of the depth of the grooves 120; or about six hundred (600) percent of the depth D of at least one of the grooves 120. In other embodiments, the depth D of one or more of the grooves 120 and the length L of one or more of the grooves 120 may be larger or smaller relative to each other.

In an embodiment, the relationship between the length L of one or more of the grooves 120 and the width W of one or more of the grooves 120 may be configured to improve cooling, lubrication, and/or bearing capacity of the superhard bearing elements 108 and/or the support ring 102. For example, the length L of at least one of the grooves 120 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the width W of at least one of the grooves 120. In addition, the length L of at least one of the grooves 120 may be: about four hundred (400) percent to about eight hundred (800) percent; or about five hundred (500) percent to about seven hundred (700) percent; or at least about six hundred (600) percent of the width W of at least one of the grooves 120. In other embodiments, the width W of one or more of the grooves 120 and the length L of one or more of the grooves 120 may be larger or smaller relative to each other.

In an embodiment, the relationship between the depth D of one or more of the grooves 120 and the width W of the one or more of the grooves 120 may be configured to improve cooling, lubrication, and/or bearing capacity of the superhard bearing elements 108 and/or the support ring 102. For example, the depth D of at least one of the grooves 120 may be at least: about fifty (50) percent; about one hundred (100) percent; about one hundred and fifty (150) percent; about two hundred (200) percent; or about three hundred (300) percent of the width W of at least one of the grooves 120. In addition, the depth D of at least one of the grooves 120 may be about fifty (50) percent to about one hundred and fifty (150) percent; or about one hundred (100) percent of the width W of at least one of the grooves 120. In other configurations, the depth D of one or more of the grooves 120 and the width W of one or more of the grooves 120 may be larger or smaller relative to each other.

Figure 2A:
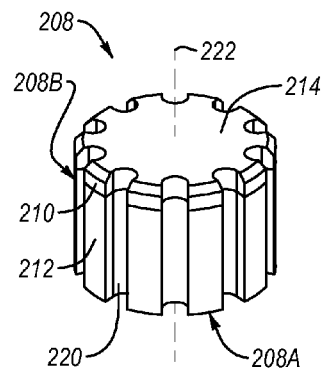
FIG. 2A is an isometric view of a superhard bearing element according to another embodiment.
Figure 2B:
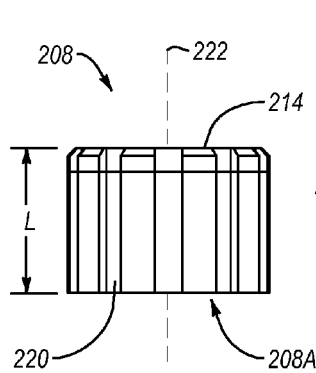
FIG. 2B is a side elevation view of the superhard bearing element shown in FIG. 2A.
Figure 2C:
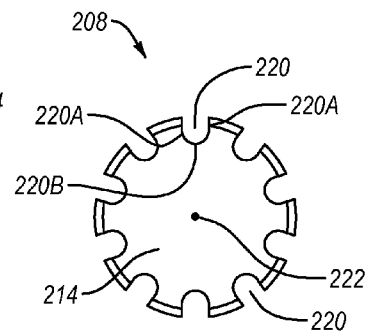
FIG. 2C is a top plan view of the superhard bearing element show in FIG. 2A.

FIGS. 2A-2C are isometric, side elevation, and top plan views of a superhard bearing element 208 according to an embodiment. The superhard bearing element 208 may include a superhard table 210 bonded to a substrate 212, and a bearing surface 214 of the superhard table 210. The superhard bearing element 208 may be made from any of the materials discussed above for the superhard bearing elements 108. In the illustrated embodiment, the superhard bearing element 208 may have a generally cylindrical shape. In other embodiments, however, the superhard bearing element 208 may have a generally rectangular shape, a generally oval shape, a generally diamond shape, a generally triangular shape, a generally non-cylindrical shape, or other suitable shape.

The superhard bearing element 208 may include a plurality of grooves 220 formed in a lateral surface 208B of the superhard bearing element 208. The superhard bearing element 208 may include two, four, seven, or any suitable number of grooves 220. Some or all of the grooves 220 may follow a generally straight path along the lateral surface 208B generally parallel to an axis 222 of the superhard bearing elements 208. While the grooves 220 are illustrated generally parallel to the axis 222 of the superhard bearing elements 208, the one or more of the grooves 220 may be formed generally nonparallel to the axis 222 of the superhard bearing elements 208. For example, the grooves 220 may follow a generally curved path, a generally S-shaped path, a generally helical path, a generally V-shaped path, or the like. In an embodiment, some or all of the grooves 220 may have a length L that extends generally between the bearing surface 214 and a bottom surface 208A. In another embodiment, the length L of some or all of the grooves 220 may extend only through a first location between the bearing surface 214 and the bottom surface 208A and a second location. In other embodiments, some or all of the grooves 220 may have a length L that extends through a portion of the bearing surface 214, through a portion of the substrate 212, or a combination thereof.

As illustrated in FIG. 2C, the groove 220 may include a cross-sectional area at least partially defined between sidewalls 220A and a bottom portion 220B. In an embodiment, the cross-sectional shape may be generally U-shaped. Such a configuration may increase surface area and/or cause the lubricating fluid flowing across the grooves 220 to abruptly slow and change flow direction to enhance heat removal from the superhard bearing elements 208 to thereby reducing the risk of the superhard bearing elements 208 overheating.

Moreover, flow of the lubricating fluid generally traverse to the grooves 220 may create eddies in the lubricating fluid to enhance the cooling effect of the lubricating fluid. In other embodiments, the grooves 220 may have a generally v-shaped cross-section, a generally circular cross-section, a generally rectangular cross-section, a generally rounded rectangular shape, a generally trapezoidal cross-section, combinations thereof, or the like.

Figure 3A:
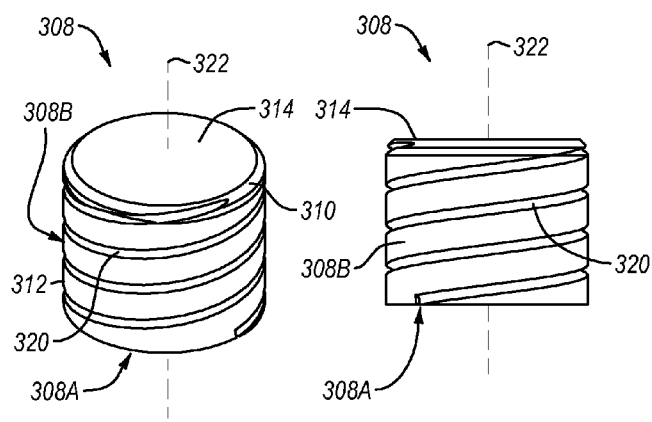
FIG. 3A is an isometric view of a superhard bearing element according to another embodiment.
Figure 3B:
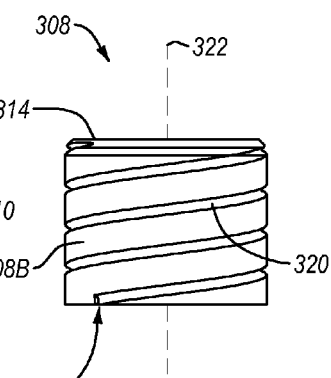
FIG. 3B is a side elevation view of the superhard bearing element shown in FIG. 3A.
Figure 3C:
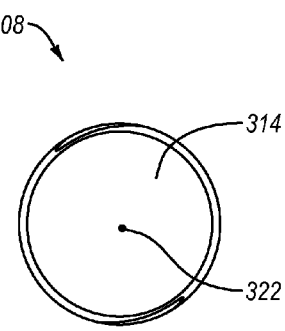
FIG. 3C is a top plan view of the superhard bearing element shown in FIG. 3A.

FIGS. 3A-3C are isometric, side elevation, and top plan views of a superhard bearing element 308 according to an embodiment. The superhard bearing element 308 may include a superhard table 310 bonded to a substrate 312, and a bearing surface 314 of the superhard table 310. The superhard bearing element 308 may be made from any of the materials discussed in relation to the superhard bearing elements 108. In the illustrated embodiment, the superhard bearing element 308 may have a generally cylindrical shaped body. In other embodiments, however, the superhard bearing element 308 may have a generally rectangular shape, a generally oval shape, a generally wedge shape, a generally triangular shape, or other suitable shape.

The superhard bearing element 308 may include a groove 320 formed in a lateral surface 308B of the superhard bearing element 308. In other embodiments, the superhard bearing element 308 may include two, three, or ten, or any suitable number of grooves 320.

The groove 320 may follow a path generally extending along a right-handed or left-handed curve or helix. The one or more grooves 320 may follow a generally helical path, a generally double helical path, a generally spiral path, or other suitable path. In an embodiment, the path may correspond to a length of the one or more grooves 320. The groove 320 may extend about the periphery of the superhard bearing element 308 between about two (2) and ten (10) times, or more. Such a configuration may allow the lubricating fluid to flow about the superhard bearing element 308 in a spiraling pattern to enhance heat removal from the superhard bearing element 308. In other embodiments, the groove 320 may extend about the periphery of the superhard bearing elements 308 less than one (1) time, five (5) times, seven (7) times, ten (10) times, or any suitable number of times.

In an embodiment, the groove 320 may extend generally between the bearing surface 314 and the bottom surface 308A of the superhard bearing element 308. In other embodiments, the groove 320 may extend generally between the bearing surface 314 and a first location between the bearing surface 314 and a bottom surface 308A. In yet other embodiments, the groove 320 may extend generally between the bottom surface 308A and a second location between the bottom surface 308A and the bearing surface 314. In other embodiments, the groove 320 may extend between a first location and a second location.

Figure 4A:
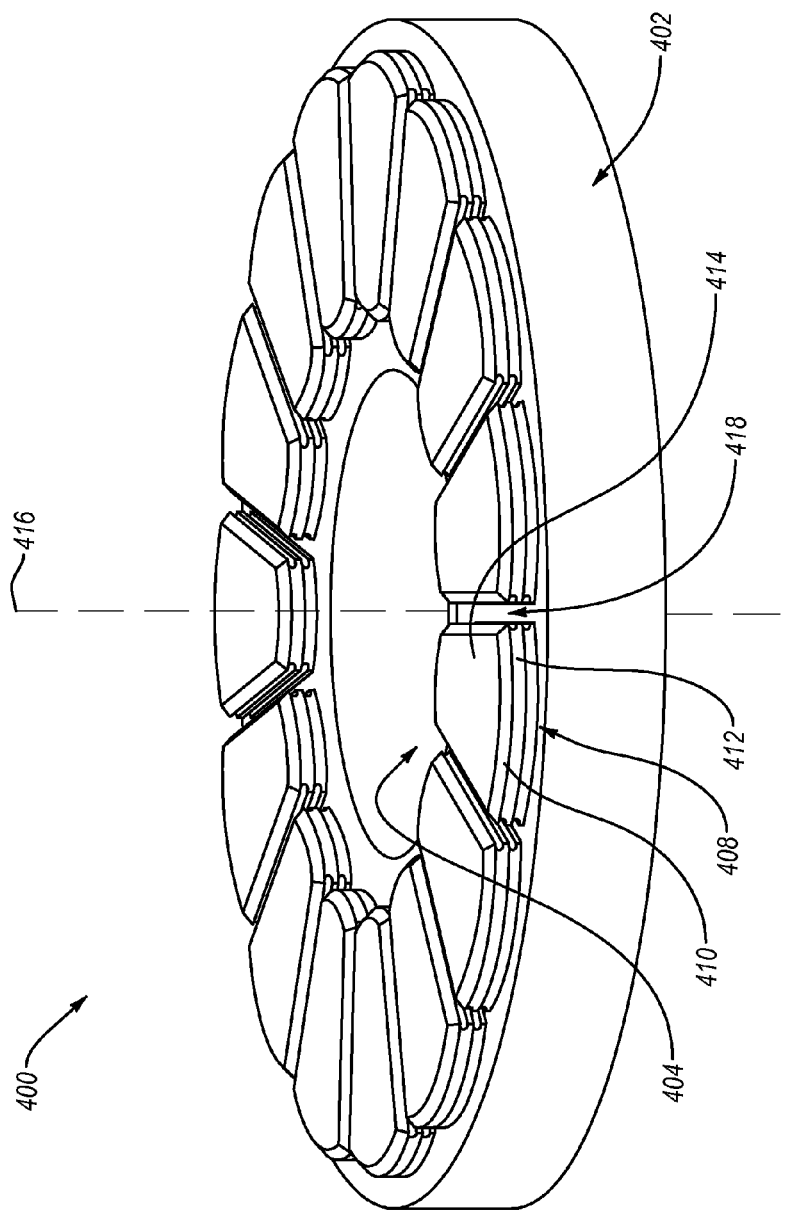
FIG. 4A is an isometric view of a thrust-bearing assembly according to an embodiment.
Figure 4B:
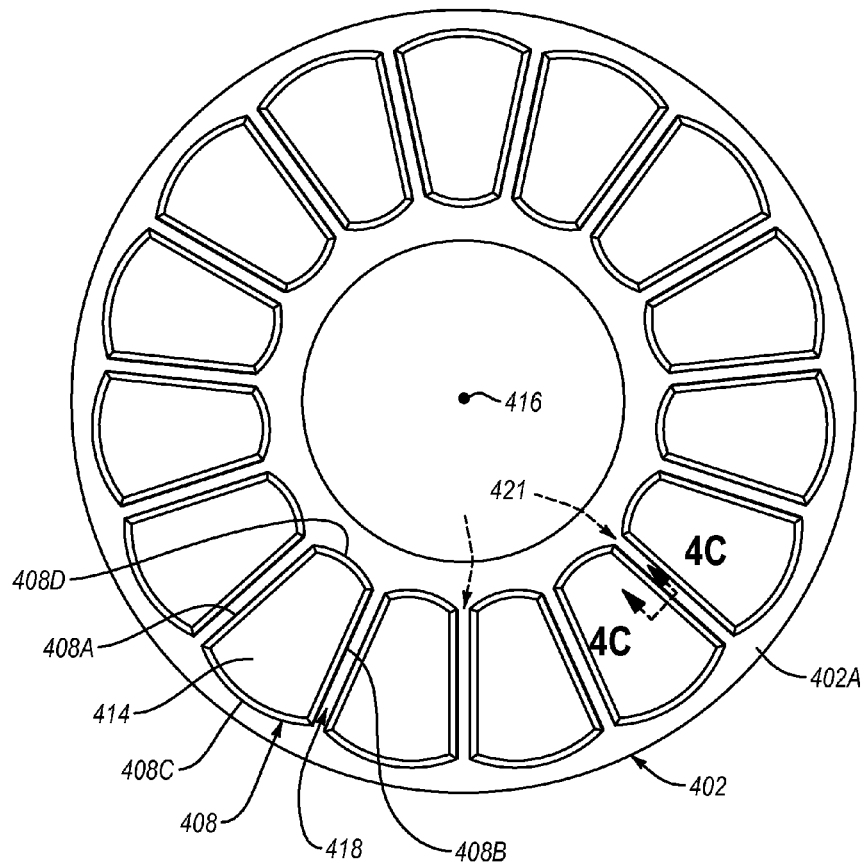
FIG. 4B is a top plan view of the thrust-bearing assembly shown in FIG. 4A.
Figure 4C:
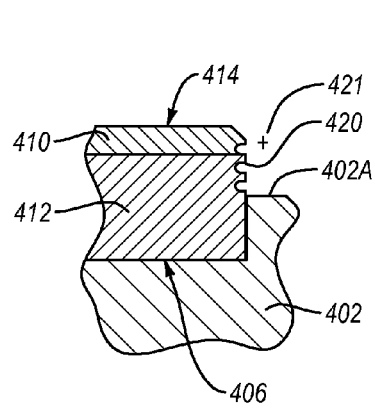
FIG. 4C is a cross-sectional view of the thrust bearing assembly shown in FIG. 4B taken along line 4C-4C.

FIGS. 4A and 4B are isometric and top plan views of a thrust-bearing assembly 400 according to an embodiment. The thrust-bearing assembly 400 may form a stator or a rotor of thrust-bearing apparatus. As shown in FIGS. 4A and 4B, the thrust-bearing assembly 400 may include a support ring 402 defining an opening 404 through which a shaft (not shown) of, for example, a downhole drilling motor may extend. Similar to the support ring 102, the support ring 402 may be made from a variety of different materials. For example, the support ring 402 may comprise a metal, alloy steel, a metal alloy, carbon steel, stainless steel, tungsten carbide, or any other suitable conductive or non-conductive material. The support ring 402 may also include a plurality of recesses 406 (shown in FIG. 4C) formed therein.

The thrust-bearing assembly 400 further may include a plurality of superhard bearing elements 408. In an embodiment, one or more of the superhard bearing elements 408 may have a generally wedge shaped body. In other embodiments, one or more of the superhard bearing elements 408 may have a generally rectangular body, a generally oval shaped body, or any other suitable shaped body. The superhard bearing elements 408 may include a superhard table 410 bonded to a substrate 412, and a bearing surface 414 of the superhard table 410. The superhard bearing elements 408 are illustrated in FIGS. 4A and 4B being distributed circumferentially about a thrust axis 416 along which a thrust force may be generally directed during use. The superhard bearing elements 408 may be circumferentially distributed about the thrust axis 416 in one row, two rows, three rows, or any number of suitable rows. As shown, gaps 418 may be located between adjacent ones of the superhard bearing elements 408 through which lubricating fluid may flow, as illustrated by flow arrows 421. In an embodiment, at least one of, some of, or all of the gaps 418 may exhibit a width of about 0.00020 inches to about 0.100 inches, such as about 0.00040 inches to about 0.0010 inches, or about 0.00040 inches to about 0.080 inches. In other embodiments, the gaps 418 may have widths that are relatively larger or smaller. In other embodiments, the gaps 418 may substantially be zero and the adjacent ones of the superhard bearing elements 408 may abut each other. In other embodiments, one or more of the gaps 418 may have different widths. For example, one pair of adjacent ones of the superhard bearing elements 408 may be closer together than another pair of adjacent ones of the superhard bearing elements 408.

Each of the superhard bearing elements 408 may be partially disposed in a corresponding one of the recesses 406 (shown in FIG. 4C) of the support ring 402. The superhard bearing elements 408 may be partially positioned in and secured to the recesses 406 via brazing, welding, soldering, press-fitting, threadly attaching, fastening with a fastener, combinations of the foregoing, or another suitable technique. Similar to the superhard bearing elements 108, the superhard bearing elements 408 may be machined to tolerances and mounted in the support ring 402 and/or attached to the support ring 402. Bearing surfaces 414 may be planarized (e.g., by lapping and/or grinding) and/or positioned so that the bearing surfaces 414 are substantially coplanar. Optionally, one or more of the superhard bearing elements 408 may exhibit a peripherally extending edge chamfer. However, in other embodiments, the edge chamfer may be omitted.

Figure 4D:
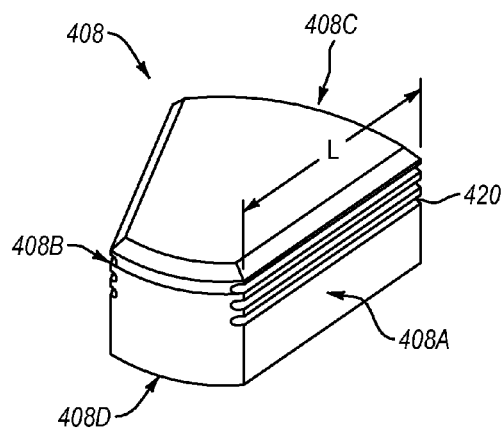
FIG. 4D is an isometric view of one of the superhard bearing elements removed from the thrust-bearing assembly shown in FIG. 4A.
Figures 4E, 4F:
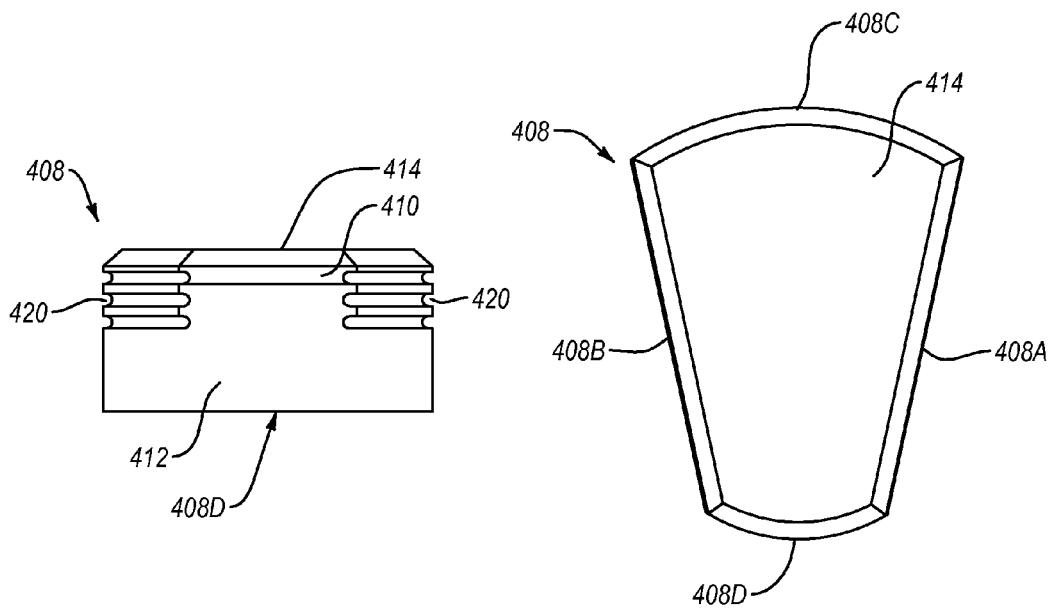
FIG. 4E is a side elevation view of the superhard bearing element shown in FIG. 4D.
FIG. 4F is a top plan view of the superhard bearing element shown in FIG. 4D.

FIGS. 4D-4F are isometric, side elevation, and top plan views of a superhard bearing element 408 removed from the thrust-bearing assembly 400. The superhard bearing element 408 may be made from any of the materials discussed above for the superhard bearing elements 108. The superhard bearing elements 408 may include a first lateral surface 408A, a second lateral surface 408B, a first end surface 408C, and a second end surface 408D. The first lateral surface 408A and the second lateral surface 408B of each of the superhard bearing elements 408 may extend between the first end surface 408C and the second end surface 408D and vice versa. In an embodiment, the first lateral surface 408A and the second lateral surface 408B may be non-parallel to each other such that the superhard bearing elements 408 have a wedge-like shape. In the illustrated embodiment, both the first end surface 408C and the second end surface 408D may have a convex curvature. In other embodiments, the first end surface 408C and the second end surface 408D may have symmetrical edge configurations, asymmetrical edge configurations, curved edge configurations, irregular edge configurations, or other suitable edge configurations. For example, the first end surface 408C and the second end surface 408D may take the form of any portion of a circle, oval, square, rectangle, rhombus, triangle, or virtually any other simple, complex, regular, irregular, or non-symmetrical geometric shape. Optionally, the first end surface 408C may have an area greater than an area of the second end surface 408D. In other embodiments, the first end surface 408C and the second end surface 408D may be substantially the same size.

Like the superhard bearing elements 108, 208, and 308, one or more of the superhard bearing elements 408 may include one or more features (e.g., at least one groove) configured to influence bearing capacity and/or influence cooling of the superhard bearing elements 408. For example, one or more grooves 420 may be formed in the first lateral surface 408A and/or the second lateral surface 408B of the superhard bearing elements 408. One or more of the grooves 420 may be formed by CNC milling, EDM, laser-cutting, grinding, combinations thereof, or otherwise machining the one or more grooves 420 in the superhard bearing elements 408 before or after securing the superhard bearing elements 408 to the support ring 402.

In an embodiment, the grooves 420 may be formed substantially parallel to the bearing surface 414 of the superhard bearing element 408. Some or all of the grooves 420 may have a length that extends along a path between the first end surface 408C and the second end surface 408D, or vice versa. In other embodiments, the length L of some or all of the grooves 420 may extend along only a portion of the first lateral surface 408A and/or the second lateral surface 408B. For example, the length L of a groove 420 may extend between the first end surface 408C and an intermediate location between the first end surface 408C and the second end surface 408D. Moreover, while the grooves 420 are illustrated following a generally straight path, some or all of the grooves 420 may follow a generally curved path, a generally s-shaped path, a generally sinusoidal path, or any other suitable path. As illustrated, each of the grooves 420 may have at least substantially the same length L. However, in other embodiments, some or all of the grooves 420 may have substantially different lengths L, respectively. Some or all of the grooves 420 may be further defined by a bottom portion and opposing sidewalls. Similar to the grooves 120, at least one of the grooves 420 may have a width W (not shown) and a depth D (not shown). Variations in the D and/or the width W of the grooves 420 may help the grooves 420 lubricate and/or cool the superhard bearing elements 408. While all the superhard bearing elements 408 are shown including substantially identical grooves 420, in other embodiments, only a portion of the superhard bearing elements 408 may have substantially identical grooves 420 and/or the superhard bearing elements 408 may have grooves 420 of varying sizes and/or configurations. The grooves 420 may include edge features configured to influence flow conditions of the lubricating fluid. For example, the grooves 420 may include beveled edges, rounded edges, chamfered edges, or the like. One or more of the grooves may include edges that are sharpened, notched, irregularly shaped, combinations thereof, or the like. Such a configuration may allow the grooves 420 to partially agitate, break-up or create desired flow characteristics in the lubricating fluid.

Figures 4G, 4H, 4I:
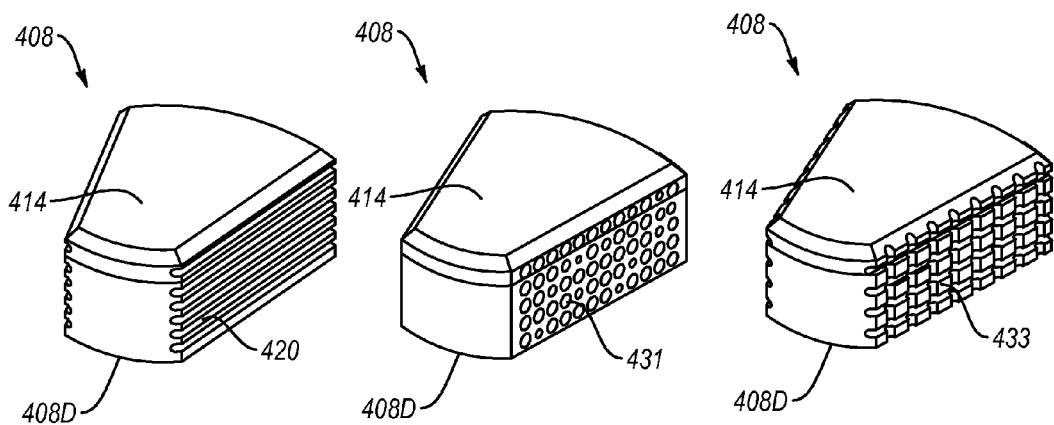
FIG. 4G is an isometric view of a superhard bearing element according to another embodiment.
FIG. 4H is an isometric view of a superhard bearing element according to another embodiment.
FIG. 4I is an isometric view of a superhard bearing element according to another embodiment.

The grooves 420 may be formed in rows positioned between the bearing surface 414 and a first location above a bottom surface of the superhard bearing element 408. In an embodiment, the first location may generally correspond to an upper surface 402A of the support ring 402 such that the grooves 420 are positioned between the bearing surface 414 and the upper surface 402A of the support ring 402 during operation of the thrust-bearing assembly 400. In other embodiments, the first location may be below the upper surface 402A of the support ring 402. In yet other embodiments, the grooves 420 may be formed in rows positioned substantially between the bearing surface 414 and the bottom surface of the superhard bearing element 408 as shown in FIG. 4G. Such a configuration may allow the grooves 420 to be located within the recesses 406 during operation of the thrust-bearing assembly 400. In other embodiments, the position of the rows of grooves 420 may vary from one superhard bearing element 408 to another.

Referring again to FIG. 4C, the grooves 420 may influence flow conditions between adjacent ones of the superhard bearing elements 408 during operation of the thrust-bearing assembly 400. For example, as shown by the flow arrow 421, the grooves 420 may increase the surface area of the superhard bearing elements 408 in contact with lubricating fluid flowing between adjacent ones of the superhard bearing elements 408. In an embodiment, the grooves 420 may direct lubricating fluid flowing between adjacent ones of the superhard bearing elements 408 about and/or over the superhard bearing elements 408 and/or the support ring 402. For example, at least some of the grooves 420 may extend along a curved path toward the bearing surface 414. In another embodiment, the grooves 420 may increase the surface area of the superhard bearing elements 408 to enhance the heat transfer rate of the superhard bearing element 408.

Embodiments of the invention further include other surface topographies that may be formed into a lateral surface of a superhard bearing element. For example, dimpled, textured, recessed, cross-hatched, or other surface features or topography may be employed for increasing heat transfer from a superhard bearing element. In an embodiment, as shown in FIG. 4H, the lateral surface of the superhard bearing element 408 may include a plurality of dimples 431 formed therein to help enhance heat removal from the superhard bearing element 408. The dimples 431 may cover substantially the entire lateral surface, extending between the bearing surface 414 and a bottom surface of the superhard bearing element 408 and the second end surface 408D and the first end surface (not shown). The dimples 431 may be generally concavely shaped, variably sized, or uniformly distributed. Flow of the lubricating fluid over the dimples 431 may create small vortices and/or increase the surface area of the lateral surface in contact with the lubricating fluid to help enhance heat removal from the superhard bearing element 408. While the dimples 431 are illustrated being generally concave, variably sized, and evenly distributed, in other embodiments, the dimples 431 may have other suitable shapes, sizes, and/or distributions. For example, the dimples 431 may be generally triangular shaped or cubic shaped and may be staggered, similarly sized, and only on a portion of the lateral surface.

In another embodiment, the lateral surface of the superhard bearing element 408 may be cross-hatched to help enhance heat removal from the superhard bearing element 408. As shown in FIG. 4I, the cross-hatch 433 may include a plurality of intersecting grooves extending between the bearing surface 414, the bottom surface, the second end surface 408D, and the first end surface (not shown) of the superhard bearing element 408. The cross-hatch 433 may increase the surface area of the superhard bearing element 408 in contact with the lubricating fluid to help remove heat from the superhard bearing element 408. Moreover, the cross-hatch 433 may direct lubricating fluid about and/or over the superhard bearing element 408 to enhance heat removal.

Any of the above-described thrust-bearing assembly embodiments may be employed in a thrust-bearing apparatus.

Figure 5A:
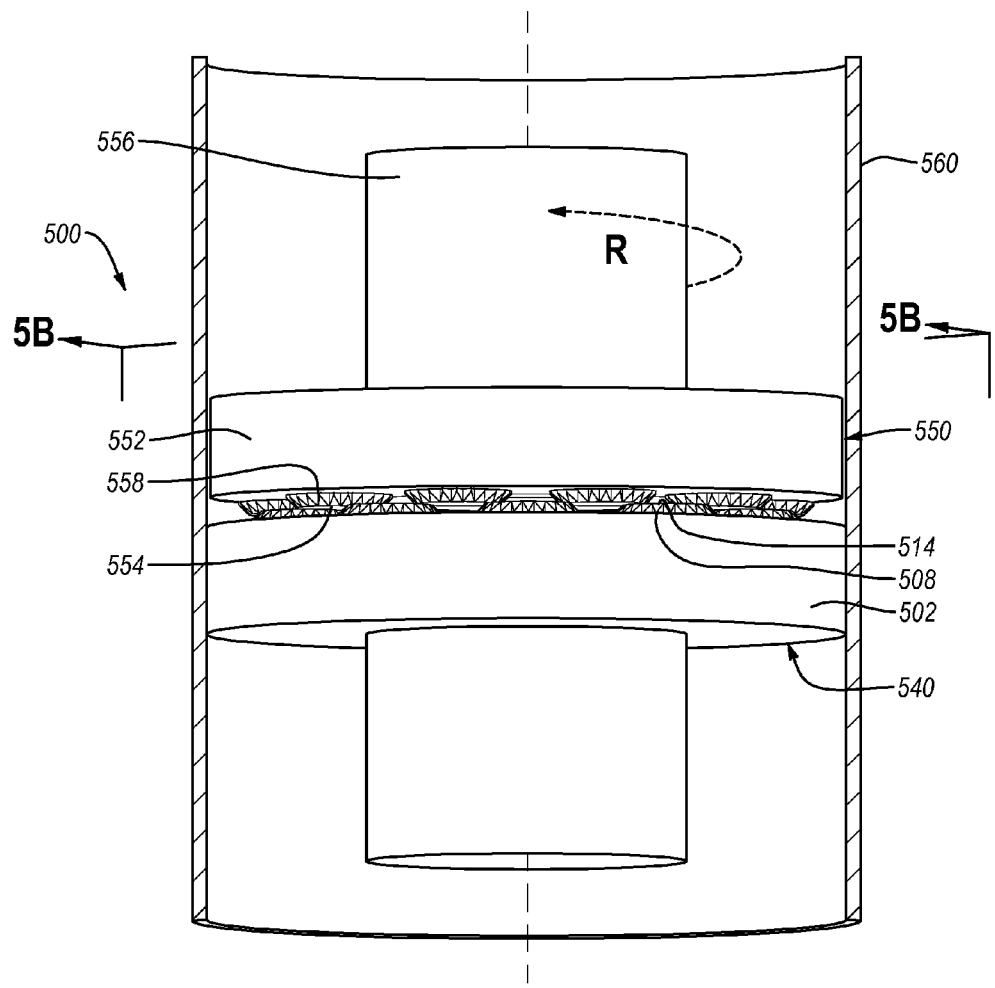
FIG. 5A is an isometric view of a thrust-bearing apparatus that may employ any of the disclosed thrust-bearing assemblies according to an embodiment, with the housing shown in cross-section.

FIG. 5A is an isometric view of a thrust-bearing apparatus 500. The thrust-bearing apparatus 500 may include a stator 540 configured as any of the previously described embodiments of thrust-bearing assemblies. The stator 540 may include a plurality of circumferentially-adjacent superhard bearing elements 508. The superhard bearing elements 508 may include a bearing surface 514 and at least some of the superhard bearing elements 508 may exhibit, for example, the configuration of the superhard bearing elements 108. The superhard bearing elements 508 may be mounted or otherwise attached to a support ring 502. The thrust-bearing apparatus 500 further may include a rotor 550. The rotor 550 may include a support ring 552 and a plurality of superhard bearing elements 558 mounted or otherwise attached to the support ring 552, with each of the superhard bearing elements 558 having a bearing surface 554. As shown, a shaft 556 may be coupled to the support ring 552 and operably coupled to an apparatus capable of rotating the shaft 556 in a direction R (or in a generally opposite direction), such as a downhole motor. For example, the shaft 556 may extend through and may be secured to the support ring 552 of the rotor 550 by press-fitting or threadly coupling the shaft 556 to the support ring 552 or another suitable technique. A housing 560 may be secured to the support ring 502 of the stator 540 and may extend circumferentially about the shaft 556 and the rotor 550.

Figure 5B:
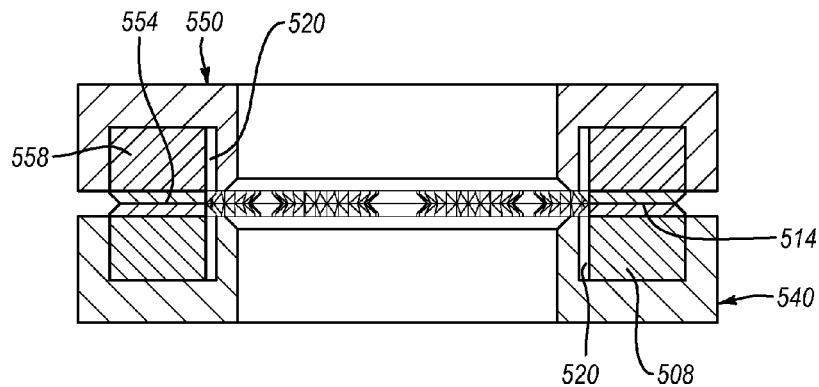
FIG. 5B is a cross-sectional view of the thrust-bearing apparatus shown in FIG. 5A taken along line 5B-5B.

FIG. 5B is a cross-sectional view in which the shaft 556 and housing 560 are not shown for clarity. In operation, lubricating filling fluid, or mud may be pumped between the shaft 556 and the housing 560, and between the superhard bearing elements 558 of the rotor 550. Grooves 520 of the superhard bearing elements 558 of the rotor 550 may help direct lubricating fluid over and/or around the superhard bearing elements 508 and 558 which in turn can greatly reduce friction between the bearing surfaces 514 of the stator 540 and the bearing surfaces 554 of the rotor 550. The grooves 520 may also help cool the superhard bearing elements 558 of the rotor 550 by increasing the surface area of the superhard bearing elements 558 in contact with the lubricating fluid thus improving bearing capacity. In other embodiments, the grooves 520 help cool the support ring 552 of the rotor 550 by increasing the surface area of the support ring 552 in contact with the lubricating fluid. In addition, the grooves 520 may help improve bearing capacity by increasing heat removal from the thrust-bearing apparatus 500 to influence potential annealing. Moreover, under certain operational conditions the thrust-bearing apparatus 500 may be operated as a hydrodynamic bearing. For example, where the rotational speed of the rotor 550 is sufficiently great and the thrust load is sufficiently low, a fluid film may develop between the bearing surfaces 514 of the stator 540 and the bearing surfaces 554 of the rotor 550. The fluid film may have sufficient pressure to reduce or prevent contact between the respective bearing surfaces 514, 554 and thus, substantially reduce wear of the superhard bearing elements 558 and/or the superhard bearing elements 508. In such a situation, the thrust-bearing apparatus 500 may be described as operating hydrodynamically. Thus, the thrust-bearing apparatus 500 may be operated to improve lubrication, cooling, bearing capacity, and/or as a hydrodynamic bearing.

Figure 6A:
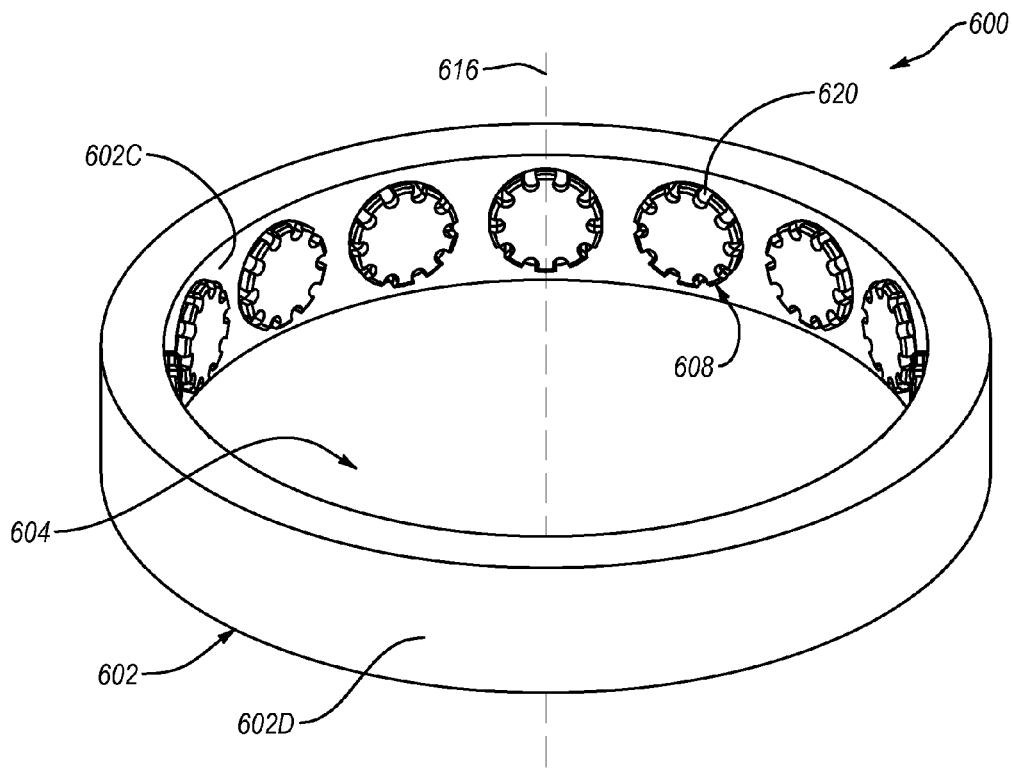
FIG. 6A is an isometric view of a radial bearing assembly according to an embodiment.
Figure 6B:
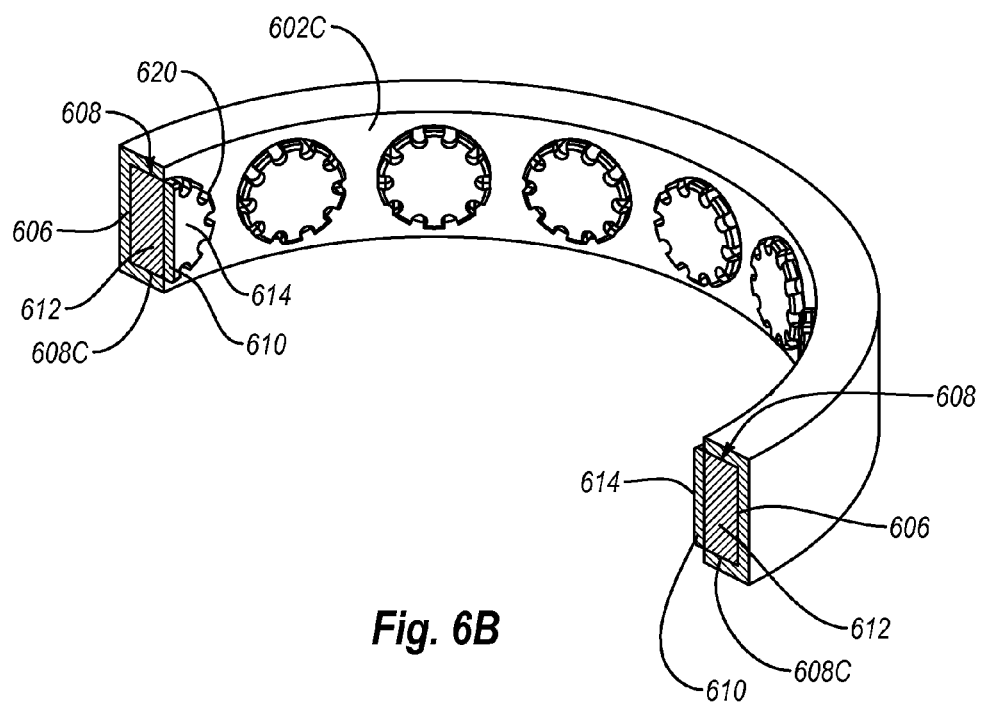
FIG. 6B is an isometric cutaway view of the radial bearing assembly shown in FIG. 6A.

The concepts used in the thrust-bearing assemblies and apparatuses described above may also be employed in the radial bearing assemblies and apparatuses. FIGS. 6A and 6B are isometric and isometric cutaway views, respectively, illustrating a radial bearing assembly 600 according to an embodiment. The radial bearing assembly 600 may include a support ring 602 extending about a rotation axis 616. The support ring 602 may include an inner peripheral surface 602C defining a central opening 604 that is capable of receiving, for example, an inner support ring or inner race. The support ring 602 may also include an outer peripheral surface 602D. A plurality of superhard bearing elements 608 may be distributed circumferentially about the rotation axis 616. Each superhard bearing element 608 may include a superhard table 610 including a concavely-curved bearing surface 614 (e.g., curved to lie on an imaginary cylindrical surface). Each superhard table 610 may be bonded or attached to a corresponding substrate 612 (shown in FIG. 6B). The superhard bearing elements 608 may have a generally cylindrical shape and each made from any of the materials discussed above for the superhard bearing elements 108. In other embodiments, the superhard bearing elements 608 may have a non-cylindrical shape, a generally wedge-like shape, a generally rectangular shape, a circular shape, or any other suitable shape. In an embodiment, at least some of the superhard bearing elements 608 may include a plurality of grooves 620 formed in a lateral surface 608C of the superhard bearing element 608. The grooves 620 may be configured similar to the grooves 120, 220, 320, 420, or any other groove disclosed herein. As illustrated in FIGS. 6A and 6B, the superhard bearing elements 608 may be distributed circumferentially about the rotation axis 616 in corresponding recesses 606 formed in the support ring 602 and arranged in a single row. In other embodiments, the superhard bearing elements 608 may be circumferentially distributed in two rows, three rows, four rows, or any number of rows.

Figure 7:
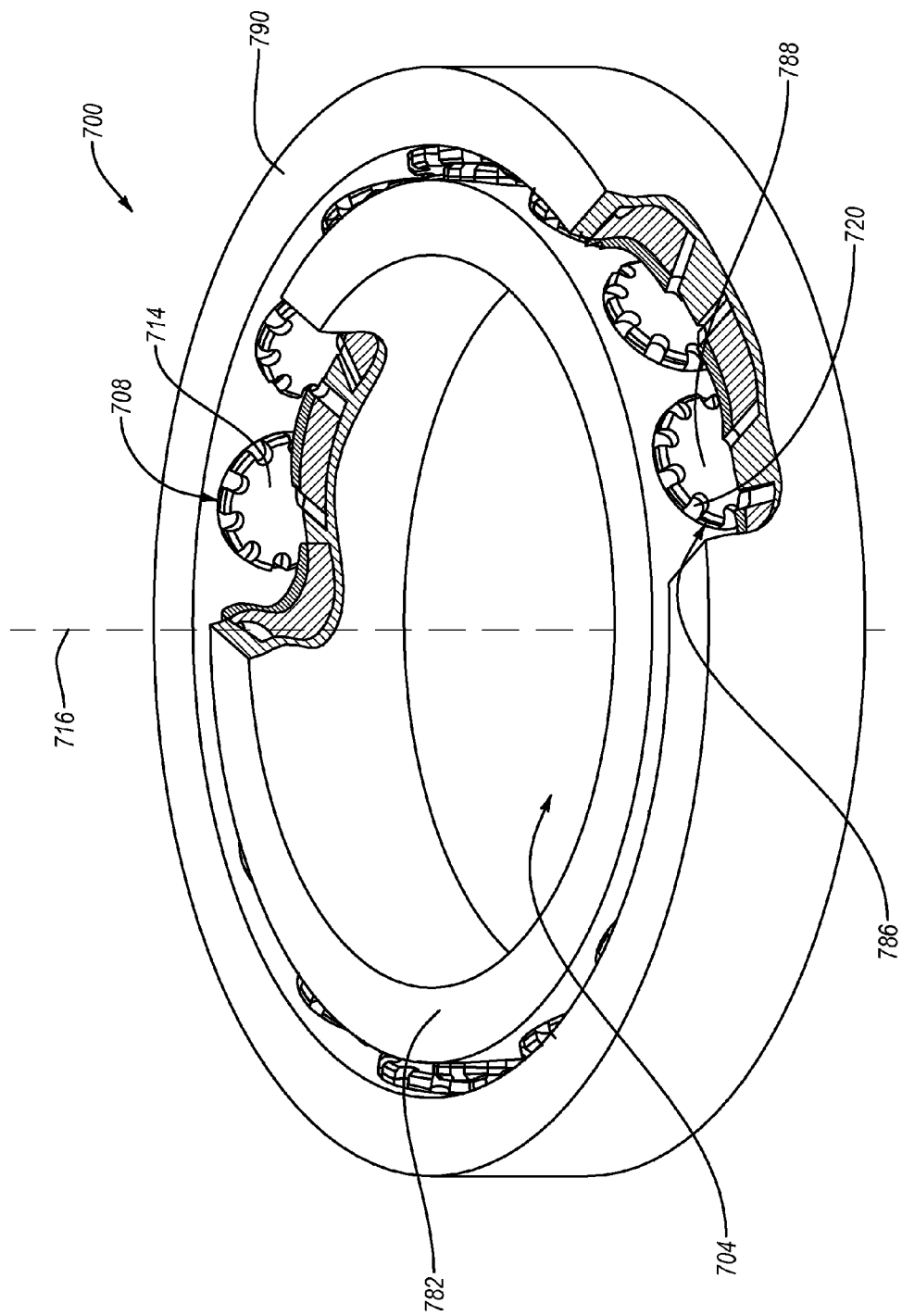
FIG. 7 is an isometric cutaway view of a radial bearing apparatus that may utilize any of the disclosed radial bearing assemblies according to various embodiments.

FIG. 7 is an isometric cutaway view of a radial bearing apparatus 700 according to an embodiment. The radial bearing apparatus 700 may include an inner race 782 (i.e., a rotor). The inner race 782 may define an opening 704 and may include a plurality of circumferentially-adjacent superhard bearing elements 786 distributed about a rotation axis 716, each of which includes a convexly-curved bearing surface 788. The radial bearing apparatus 700 may further include an outer race 790 (i.e., a stator) that extends about and receives the inner race 782. The outer race 790 may include a plurality of circumferentially-adjacent superhard bearing elements 708 distributed about the rotation axis 716, each of which includes a concavely-curved bearing surface 714 curved to correspond to the convexly-curved bearing surfaces 788. The superhard bearing elements 708 and 786 may have a generally cylindrical shape and each may be made from any of the materials discussed above for the superhard bearing elements 108. In other embodiments, the superhard bearing elements 708 and 786 may have a generally wedge-like shape, a generally rectangular shape, a non-cylindrical shape, or any other suitable shape. The terms "rotor" and "stator" refer to rotating and stationary components of the radial bearing apparatus 700, respectively. Thus, if the outer race 790 is configured to remain stationary, the outer race 790 may be referred to as the stator and the inner race 782 may be referred to as the rotor.

At least some of the superhard bearing elements 786 and/or the superhard bearing elements 708 may include a plurality of grooves 720 formed in a lateral surface thereof. One or more of the grooves 720 may be configured to influence lubrication, cooling, and/or bearing capacity of the superhard bearing elements 786, 708 and/or the inner race 782 and/or the outer race 790. Moreover, under certain operating conditions the grooves 720 may help form a fluid film similar to the description in relation to FIGS. 5A and 5B. A shaft or spindle (not shown) may extend through the opening 704 and may be secured to the rotor 782 by press-fitting the shaft or spindle to the rotor 782, threadly coupling the shaft or spindle to the rotor 782, or another suitable technique. A housing (not shown) may also be secured to the stator 790 using similar techniques.

The radial bearing apparatus 700 may be employed in a variety of mechanical applications. For example, so-called "rotary cone" rotary drill bits, pumps, transmissions or turbines may benefit from a radial bearing apparatus discussed herein.

It is noted that the outer race 790 of the radial bearing apparatus 700 is shown also including a plurality of circumferentially-distributed superhard bearing elements 708 with a plurality of grooves configured to influence lubrication, cooling, and/or bearing capacity of the radial bearing apparatus 700. However, in other embodiments, an outer race or the inner race of a radial bearing apparatus may include a plurality of circumferentially distributed superhard bearing elements without grooves.

Figure 8:
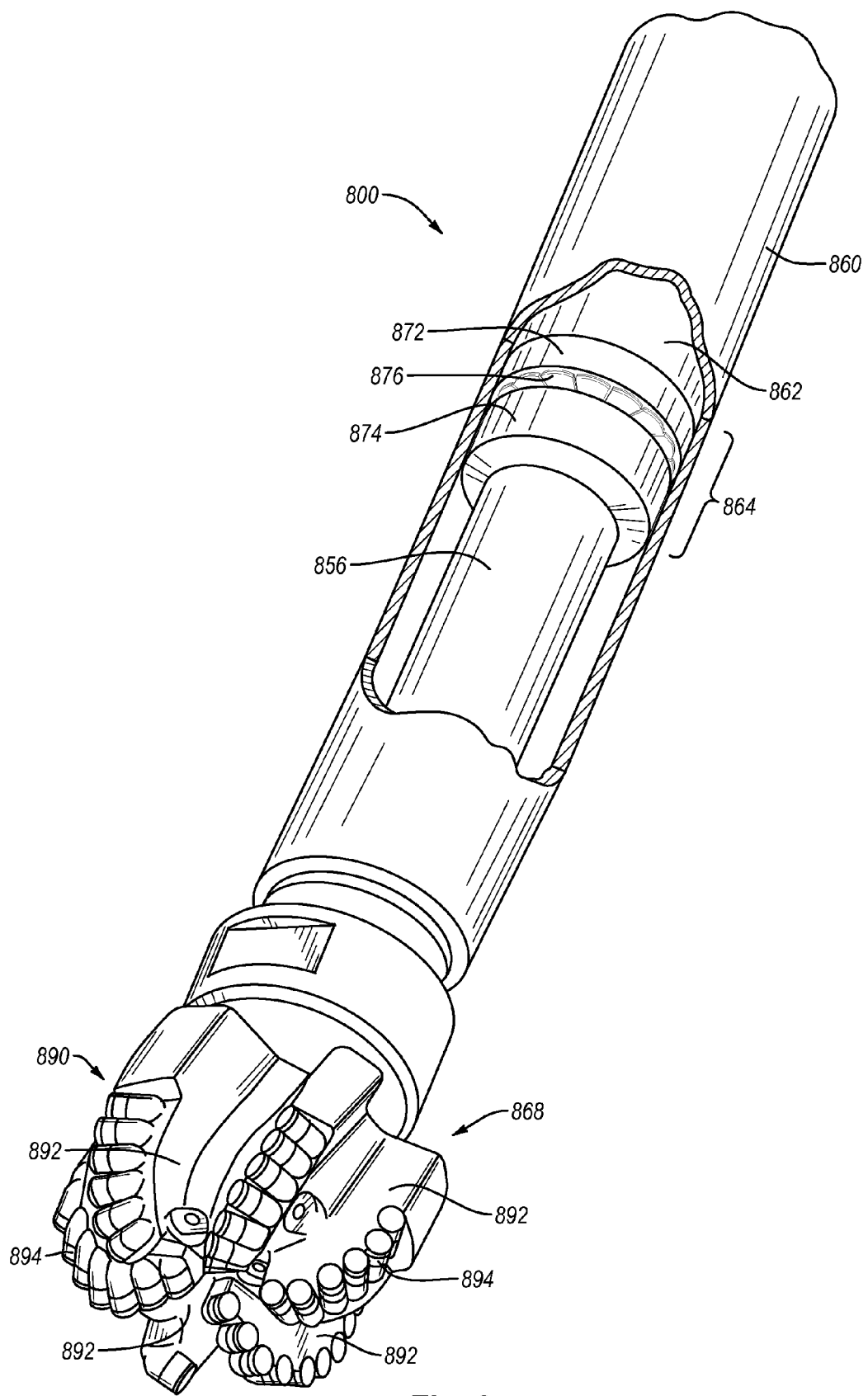
FIG. 8 is a schematic isometric cutaway view of a subterranean drilling system that may utilize any of the disclosed bearing assemblies according to various embodiments.

Any of the embodiments for bearing apparatuses discussed above may be used in a subterranean drilling system. FIG. 8 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-bearing apparatus 864 may be operably coupled to the downhole drilling motor 862. The thrust-bearing apparatus 864 may be configured as any of the previously described thrust-bearing apparatus embodiments. A rotary drill bit 868 may be configured to engage a subterranean formation and drill a borehole and may be connected to the output shaft 856. The rotary drill bit 868 is a fixed-cutter drill bit and is shown comprising a bit body 890 having radially-extending and longitudinally-extending blades 892 with a plurality of PDCs secured to the blades 892. However, other embodiments may utilize different types of rotary drill bits, such as core bits and/or roller-cone bits. As the borehole is drilled, pipe sections may be connected to the subterranean drilling system 800 to form a drill string capable of progressively drilling the borehole to a greater size or depth within the earth.

The thrust-bearing apparatus 864 may include a stator 872 that does not rotate and a rotor 874 that may be attached to the output shaft 856 and rotates with the output shaft 856. As discussed above, the thrust-bearing apparatus 864 may be configured as any of the embodiments disclosed herein. For example, the stator 872 may include a plurality of circumferentially-distributed superhard bearing elements 876 similar to the superhard bearing elements 508 shown and described in the thrust-bearing apparatus 500 of FIG. 5A. The rotor 874 may include a plurality of circumferentially-distributed superhard bearing elements (not shown) such as shown and described in relation to FIGS. 1A-4G.

In operation, drilling fluid may be circulated through the downhole drilling motor 862 to generate torque and rotate the output shaft 856 and the rotary drill bit 868 attached thereto so that a borehole may be drilled. A portion of the drilling fluid may also be used to lubricate opposing bearing surfaces of the stator 872 and the rotor 874. When the rotor 874 is rotated, grooves of the superhard bearing elements of the rotor 874 may pump the drilling fluid onto the bearing surfaces of the stator 872 and/or the rotor 874, as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
    a plurality of superhard bearing elements distributed circumferentially about an axis, each of the plurality of superhard bearing elements including a bearing surface, each of the plurality of superhard bearing elements including a superhard table directly bonded to a cemented carbide substrate, the superhard table having a plurality of bonded diamond grains defining interstitial regions, at least one of the plurality of superhard bearing elements including at least one texture feature formed in a lateral surface thereof; and
    a support ring including a plurality of recesses therein that are circumferentially spaced from each other by respective portions of the support ring, each of the plurality of recesses receiving a corresponding one of the plurality of superhard bearing elements,
    wherein the at least one texture feature is effective to increase a surface area of the at least one of the plurality of superhard bearing elements in contact with fluid during operation.

2. The bearing assembly of claim 1, wherein the at least one texture feature is positioned and configured to direct fluid over and/or around one or more of the plurality of superhard bearing elements.

3. The bearing assembly of claim 1, wherein the at least one texture feature extends between the bearing surface of the at least one of the plurality of superhard bearing elements and a location positioned between an upper surface of the support ring and a bottom surface of the at least one of the plurality of superhard bearing elements.

4. The bearing assembly of claim 1, wherein the at least one texture feature follows a path substantially extending between the bearing surface of the at least one of superhard bearing elements and a bottom surface of the at least one of the plurality of superhard bearing elements.

5. The bearing assembly of claim 4, wherein the path comprises at least one of a generally curved path, a generally linear path, a generally semi-cylindrical path, or a generally helical curved path.

6. The bearing assembly of claim 1, wherein at least a portion of the at least one texture feature includes a cross-sectional area at least partially defined between opposing sidewalls, the cross-sectional area having a generally v-shaped geometry, a generally parabolic geometry, or a generally rectangular geometry.

7. The bearing assembly of claim 1, wherein the at least one texture feature includes a length extending along a portion of the lateral surface of the at least one of the plurality of the superhard bearing elements and a depth extending between the lateral surface and a bottom portion of the at least one texture feature.

8. The bearing assembly of claim 7, wherein the length of the at least one texture feature is about four hundred (400) percent to eight hundred (800) percent of the depth of the at least one texture feature.

9. The bearing assembly of claim 1, wherein the at least one texture feature follows a path substantially extending between a first end surface and a second end surface of one or more of the at least one of the plurality of superhard bearing elements.

10. The bearing assembly of claim 1, wherein the at least one texture feature comprises a plurality of grooves.

11. The bearing assembly of claim 1, wherein the at least one texture feature comprises dimples, recesses, protrusions, or cross-hatching grooves.

12. The bearing assembly of claim 1, wherein the at least one of the plurality of superhard bearing elements comprises a non-cylindrical superhard bearing element.

13. The bearing assembly of claim 1, wherein the axis is a thrust axis, and wherein the support ring and the plurality of superhard bearing elements define a thrust-bearing assembly; or wherein the axis is a rotation axis, and wherein the support ring and the plurality of superhard bearing elements define a radial bearing assembly.

14. A bearing apparatus, comprising:
    a first bearing assembly including:
        a first plurality of superhard bearing elements distributed circumferentially about an axis, each of the first plurality of superhard bearing elements including a bearing surface, each of the plurality of superhard bearing elements including a superhard table directly bonded to a cemented carbide substrate, the superhard table having a plurality of bonded diamond grains defining interstitial regions, at least one of the first plurality of superhard bearing elements including at least one texture feature formed in a lateral surface thereof; and
        a first support ring including a plurality of recesses therein that are circumferentially spaced from each other by respective portions of the support ring, each of the plurality of recesses receiving a corresponding one of the first plurality of superhard bearing elements; and
    a second bearing assembly including:
        a second plurality of superhard bearing elements generally opposed the first plurality of superhard bearing elements of the first bearing assembly; and
        a second support ring that carries the second plurality of superhard bearing elements,
    wherein the at least one texture feature is effective to increase a surface area of the at least one of the plurality of superhard bearing elements in contact with fluid during operation.

15. The bearing assembly of claim 14, wherein the first bearing assembly is configured as a rotor, and the second bearing assembly is configured as a stator.

16. The bearing apparatus of claim 14, wherein at least one of the second plurality of superhard bearing elements comprises at least one texture feature formed in a lateral surface thereof.

* * * * *